June 19, 1962  P. M. F. ZENS ETAL  3,039,320
DEVICE FOR CHANGING SPEED IN GEAR-BOXES
Filed May 20, 1958  2 Sheets-Sheet 2
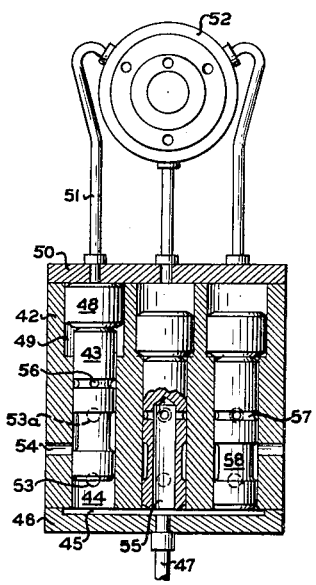
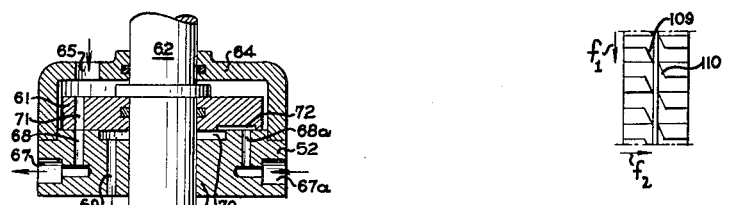
INVENTORS
PIERRE MARIE FÉLIX ZENS
MICHEL ALBERT JULES HONNORÉ

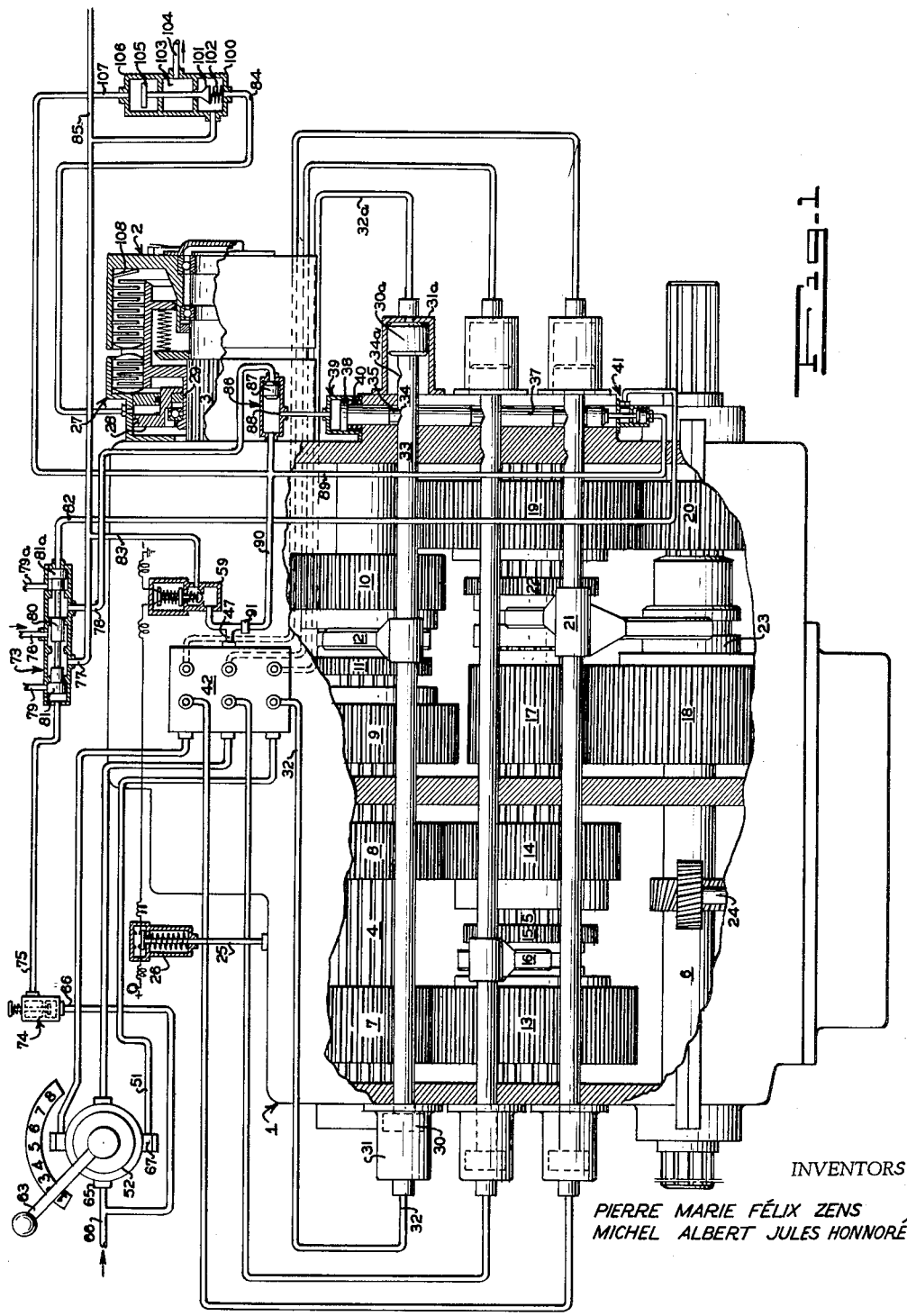

A method of changing speed in gear-boxes is already known according to which, when shifting gears, a shaft carrying a pinion to be put in mesh with another pinion carried by another shaft is completely stopped, and said other shaft is also stopped, or may be only almost stopped provided the remaining driving power and speed are relatively low, so as to facilitate the engagement of the pinions without having to provide the gear-box with synchromesh devices, since the coupling of the various gears takes place when the teeth are almost stopped.

It is convenient, for carrying out said known method, to lock the gears in the engaged position by locking means which are released under the control of the reaction torque of a brake having a delayed and moderate action on the driven shaft of the gear-box, in order to prevent any undue change of gear when said driven shaft rotates under velocity and torque conditions higher than predetermined values.

The present invention has for an object to simplify the construction of such gear-boxes, to make the operation thereof simpler and more flexible by providing an efficient control to stop the rotating members of the gear-box and by dispensing with the auxiliary brake owing to the type of construction of the gear-box with gears constantly in mesh, and to permit, moreover, the association, later if wanted, of several gear-boxes with the same selecting remote control.

According to a feature of the present invention, one shaft of the gear-box with gears constantly in mesh drives an oil pump for the pressure lubrication of the gear-box, and the delivery side of said pump is connected to a pressure-sensitive device which operates to directly or indirectly allow or forbid the movement of the gear-shifting operating mechanism.

The changes of gear cannot take place but after the gear-box input shaft has been decoupled from the engine and has been stopped or brought down to a very low speed and a very low driving torque, when the residual speed of the moving members and of the lubricating oil pump is such that the latter gives delivery pressure lower than a predetermined value.

According to another feature of the present invention, the gear-shifting operations are controlled by a preselecting pressure fluid device which determine the movements of the sliding gears subjected to the forementioned locking means, said device comprising a selector and an impulse releaser, said selector having for example three fluid flow ways alternately connected to admission or exhaust in the case of an eight-speed gear-box and, the impulse releaser a single way.

Thus, the four fluid flow ways required for the operation may easily be connected in parallel to a number of gear-boxes, for example in multiple-engine road vehicles or in coupled automobile railway cars, and such connections in parallel may include delaying means for timing in succession the actions on the various gear-boxes in order to avoid too abrupt steps in the development of the driving force of the road vehicle or of the coupled railway cars.

According to another feature of the invention the gear-box input shaft is subjected, as a particular gear is just about to be put into mesh, to a short and partial clutch coupling at the same time as the corresponding stopping brake is released.

For this purpose, the invention includes a device comprising a bleed valve to cause an adjusted leakage flow from the circuit feeding the clutch-and-brake control motor, said bleed valve being made operative when shifting gear.

To make the clutch operation flexible and progressive as desirable in this period of partial clutch coupling, a resilient disc having the form of a conical ring is provided in the clutch.

For facilitating the engagement of the gear dogs, the latter may have their engaging ends bevelled in the direction of the engaging movement.

An embodiment of the invention will now be described more fully, by way of example, with reference to the accompanying drawings, in which:

FIG. 1 is a side view, partially broken away, of a gear-box and its pressure fluid control means, according to the invention.

FIG. 2 is a diagrammatical section of the distributor or preselector, showing also its connection with the selector.

FIG. 3 is a diagrammatical axial section of the selector.

FIG. 4 is a developed view showing, diagrammatically, the shape of the gear teeth or dogs.

The apparatus illustrated in the drawings comprises a gear-box, generally designated by the reference number 1, the input shaft 3 of which is driven by a driving shaft connected to the outer drum 2, journalled on said input shaft member, of a clutch-and-brake device. Said gear-box comprises two layshafts 4, 5 and an output shaft 6. The layshaft 4 carries two fixed pinions 7, 8 and two loose pinions 9, 10 between which is disposed a double dog-wheel 11 to be actuated by a shifting fork 12. Both pinions 9, 10 are constantly in mesh with corresponding pinions, not visible in the drawing, fixed to the input shaft 3.

The pinions 7, 8 are in mesh with loose pinions 13, 14 carried by the second layshaft 5, and a double dog-wheel 15 may be put alternately into mesh with the pinions 13, 14 by a shifting fork 16. Said layshaft 5 carries a fixed pinion 17 meshing with a loose pinion 18 carried by the output shaft 6. Said second layshaft 5 carries also a loose pinion 19 meshing with a fixed pinion 20 carried by the output shaft 6. A double shifting fork 21 is provided for actuating a dog-wheel 22 rotationally driven by the shaft 5 and a dog-wheel 23 rotationally driving the shaft 6. Said dog-wheels 22, 23 may alternately engage the pinion 19 and the pinion 18.

Such a gear-box permits to obtain eight different gears between the input shaft 3 and the output shaft 6.

The output shaft 6 also drives, through a spiral gear, the shaft 24 of the oil pump which supplies pressure lubricant, through ducts not shown, to the bearings and meshing teeth of the gear-box, the oil pump delivery being also connected to the inlet 25 of a pressure-controlled electric switch 26 the contact of which is open when the pump operates and is closed when the delivery pressures fall under a predetermined value, thus providing an electric signal to indicate either that the gear-box movable members rotate normally or that they are stopped or almost stopped.

The clutch-and-brake device 2 comprises a fixed cylinder 27 fast with the braking discs and wherein operates a piston 28 engaging through an abutment the hub 29 to move the clutch and brake discs against the usual return springs. A pressure fluid, such as compressed air, fed to said piston 28 operates to disengage the gear-box input shaft from the engine and to brake said input shaft. As the gears in the box comprise pinions constantly in mesh, stopping the input shaft stops also the layshaft and the output shaft, which normally is connected to the driven members through one-way drives.

The forks 12, 16 and 21 are each fixed to an operating rod which extends through the gear-box casing and carries, at each end, a piston operated by fluid pressure in a single-acting cylinder. Said pistons, subjected in turn to pressure thrusts moving them to their end position, shift the dog-wheels from one extreme position in engagement with one pinion to the opposite extreme position.

The operative faces of the pistons 30, 30a are in front, within the cylinders 31, 31a, of the orifices of feeding pipes 32, 32a. The three piston-and-cylinder control systems are similar. The rod 33 carrying both pistons is fast for axial movement with the corresponding fork and is formed with two locking notches 34, 34a, the spacing of which corresponds to the distance of displacement of the dog-wheel and having inclined sides to cooperate with locking members of corresponding slope. The locking members are all carried by the same operating rod 37 guided in a bore formed in the gear-box casing in a direction parallel to the plane containing the axes of the fork operating rods 33. The upper portion of the locking rod 37 is fast with a piston 38 reciprocating in a pressure fluid cylinder 39 and urged to the release position by a spring 40. The opposite end of the rod 37 engages the operating head of the valve member of a locking-checking valve 41 urged by a spring to the valve closing position when the locking members are inoperative and brought to the valve opening position when the locking members are released.

The cylinders 31, 31a are respectively connected through the six pipes 32, 32a to holes made in the body of a preselector 42 shown in FIG. 2. Said preselector comprises three similar differential pistons 43 the narrower portion of which forms a slide-valve member. In the body of the preselector 42 are formed three cylinder bores 44 wherein reciprocate the slide-valve members 43 and at the ends of which may be admitted pressure fluid through a distributing groove 45 formed in a cover plate 46 and connected to a central pipe 47. The heads 48 of said slide-valve members reciprocate in a corresponding cylinder bore 49 of larger diameter than the bore 44, said bores 49 being closed by a common cover plate 50 and being connected, through holes in said cover plate, to three respective pipes 51. The pipes 51 are connected to the plate of a selector 52 to be described thereafter.

Each cylinder bore 44 is connected through radial holes 53, 53a to the corresponding tubes 32, 32a respectively, and is provided with an intermediate radial exhaust hole 54. In the slide-valve member 43 is formed a blind axial bore 55 opening in front of the groove 45 and communicating, through radial holes 56, with an annular groove 57 formed in said slide-valve member and registering with the hole 53a when the slide-valve member is fully engaged in its bore. The surface of the slide-valve member is also formed with a wider groove 58 so arranged as to connect either the hole 53 or the hole 53a with the exhaust hole 54. On the other hand, the arrangement is such that the hole 53 can be uncovered by the end of the slide-valve member.

With such an arrangement, when the slide-valve member is in its higher position, as viewed on the drawing (FIG. 2), the pipe 47 communicates with the hole 53 and the hole 53a communicates with the exhaust hole 54; when the slide-valve member is in its lower position, the pipe 47 communicates with the hole 53a and the hole 53 communicates with the hole 54. Consequently, each pipe 32 and the corresponding pipe 32a may be alternately connected to a pressure fluid supply or to exhaust. Thus are obtained eight different arrangements for the admission and exhaust connections of the three cylinders 31, corresponding to the eight possible gears of the gear-box.

The distributor 42 has been called a preselector because the pressure fluid supply through the inlet pipe 47 is controlled by a solenoid valve 59 energized through the pressure-controlled switch 26. Thus, pressure fluid can be supplied to the cylinders 31 only when the oil pressure is lower than a predetermined value, that is, when the gears in the gear-box are substantially stopped.

The above-mentioned selector 52 comprises a fixed plate 60 engaged by a movable disc 61 mounted on the shaft 62 of an operating lever 63. Said lever may be held in any one of its setting positions by any suitable spring catches.

The disc 61 is enclosed by a cover 64 connected through a hole 65 to a pressure fluid supply pipe 66. To the fixed plate 60 are connected through outlet connections 67, 67a control pipes 51 leading to the preselector 42.

The connections 67 communicate inside with axial bores 68 opening in the face of the plate 62 which is in contact with the disc 61. Similar bores 69 connect to exhaust a central recess 70 formed in the face of the fixed plate 60. The contacting face of the disc 61 is formed with through-bores at the places required for registering with the bores 68, recesses 72 being formed in said contacting face at other places for connecting some of the holes 68, such as 68a in FIG. 3, to the plate recess 70.

Thus, the three pipes 51 may be either supplied with pressure fluid or connected to exhaust. According to the setting of the lever 63, each slide-valve member 43 will be in the higher or the lower position (FIG. 2). Thus, the lever 63 establishes in the distributor 42 a preselection of a gear, and the gear is effectively shifted when the solenoid valve 59 opens.

For safety and interlocking purposes, the fluid supply to the solenoid valve 59 is neither permanent nor direct. This supply is controlled by a distributing valve 73 actuated by an impulse release 74 consisting of a pusher-operated valve of the puncher type connected in series with the distributor valve 73 in a pipe 75 branching from the pipe 66 connected directly to the pressure fluid supply source.

The distributing valve 73 comprises a cylinder divided into five chambers separated from each other by narrower portions of the cylinder wall. The central chamber is connected to a pressure fluid inlet pipe 76. The two adjacent chambers are respectively connected to communication pipes 77 and 78. The two end chambers are connected to exhaust pipes 79, 79a, and serve as single-acting cylinders. The spindle 80 of the distributor valve connects together two pistons 81, 81a operating in the two end chambers. The chamber of the piston 81 is connected to the pipe 75, whereas the chamber of the piston 81a is connected to a pipe 82 fed through the locking-checking valve 41. From the pipe 77 branches off a pipe 83 to feed the solenoid valve 59, a pipe 84 to feed the cylinder 27 of the clutch-and-brake device, and a pipe 85 connected for example to a device for putting in the idling condition the engine which drives the gear-box.

The pipe 78 feeds a double valve 86 comprising a free piston 87 and connected through a pipe 88 to the locking cylinder 39. The end of the double valve opposite to the pipe 78 is connected to the outlet pipe 89 of the valve 41. From said pipe 89 branches off a pipe 90 connected to the feed pipe 47 of the preselector 42 through a calibrated restrictor 91 acting to delay the building up of the pressure in the double valve 86 and in the checking valve 41.

For providing the required distribution, the spindle 80 of the distributing valve 73 is formed with two thinner portions and three thicker portions which are so arranged as to respectively open and sealingly close the communications by passing through the narrower portions of the cylinder of the distributor valve between the various chambers thereof. Said spindle 80 may occupy two extreme positions. In one position shown in FIG. 1, the pipe 76 feeds the pipe 77 with pressure fluid, whereas the pipe 78 is connected, to the exhaust pipe 79a and, in the opposite position, the pipe 76 feeds the pipe 78 whereas the pipe 77 is connected to the exhaust pipe 79.

The illustrated device comprises, connected in the pipe 84, a valve 100 the valve member 101 of which is urged against its seat by a spring 102, the pressure fluid flowing freely in the pipe 84 through the valve chamber.

The seat of the valve 101 opens into a chamber 103 connected to atmosphere or exhaust through a pipe 104.

Said valve-member 101 is actuated by a piston 105 operating in a cylinder 106 fed through a pipe 107 connected to the pipe 90 itself fed through the restrictor 91.

The apparatus thus described operates as follows:

The operator selects a gear by setting the selector lever 63 in the corresponding position, thus rotating the selector disc 61 to bring the required bores 71 in register with the bores 68 and the recesses 72 with other bores 68a. The corresponding arrangement of pressure supply and exhaust connections is thus established for the pipes 51. The side-valve members 43 will be set accordingly, since at this time a gear is locked and the pipe 47 is normally under pressure, fed by fluid accumulated in the pipes of the valve 41; at least, the operation of slide valve members is initiated.

After having selected a gear as described above, the operator actuates the impulse releaser 74. The spindle 80 of the distributing valve 73 connects to the pressure supply the clutch-and-brake operating cylinder and the solenoid valve 59. which however remains closed as long as the gear-box is running, and puts the engine into idling condition through the pipe 85. As the shaft 3 is decoupled and braked by the clutch-and-brake device, the gear-box is stopped, the pressure-operated switch 26 is closed and the solenoid valve 59 is energized, thus feeding pressure to the pipe 47, so that the operation of the slide valve members, already initiated as described above, is completed. The relevant tubes 32, 32a are connected to pressure or to exhaust to operate the cylinders 31, 31a as required for the selected gear.

At the same time, as soon as the releasing impulse arrives through the pipe 75, the cylinder 39 is exhausted through the pipe 78 and all the rods 33 are released by the spring 40, so that the gear shifting operation may take place freely.

This releasing action causes the closure of the checking valve 41, preventing the pipe 82 from being fed again.

Through the restrictor 91, the pressure builds up slowly in the pipe 90 and moves the valve member 87 of the double valve 86 towards the right in a delayed motion which allows for the gear shifting operation being carried out freely.

At the same time, the pressure fluid flowing through the resistor 91 enters the pipe 107 and actuates the piston 105, thus opening the valve 101 and causing a bleed flow to the pipe 104 from the fluid contained in the pipe 84 and consequently a pressure drop in the clutch cylinder 27. This bleed flow is so adjusted that a partial clutch engagement takes place together with a slight release of the brake. The shaft 3 is thus caused to rotate slowly with a low driving torque so that the teeth of the gear member connected to said shaft move in front of the teeth of the other gear member to be engaged which, connected to the output shaft, may be stationary or not.

However, the shifting operation being completed, the valve member 87 closes the pipe 78 and opens the communication between the pipe 90 and the pipe 88. The shifting rods 33 are locked again by the piston 38 compressing the spring 40. When the locking members 35 are all engaged into the notches 34, the rod 37 opens the valve 41 fed through the pipe 89 from the pipe 90, putting the pipe 82 under pressure to progressively push back the valve member 80 of the distributing valve 73. The pipe 77 is thus connected to exhaust and the pipe 78 to the pressure fluid supply, causing the valve member 87 of the double valve 86 to close the orifice of the pipe 89 and connect the pipe 88 with the pipe 78, so that pressure fluid is again fed to the locking cylinder 39.

The pipes 84 and 85 being connected to exhaust through the pipe 77, the engine speeds up and the clutch and the brake are released, so that the movable gear members in the newly engaged gear are again driven into normal motion. The oil pressure rises, breaking the contact of the pressure-switch 26, and the solenoid valve 59 closes again.

The locking means hold the engaged gear and prevent any shifting, even if changes happen in the positions of the slide-valves in the distributor 42.

A new change of gear will be operated in the same way as described above.

Such a gear-box has no neutral position. This may be made up by coupling the gear-box with a reversing gear having a neutral position, more particularly in a railway car.

It is to be noted that the full clutch engagement is dependent on the locking, checked by the valve 41. The partial engagement of the clutch, causing the gear-box input shaft to rotate slowly with a low driving torque, independently of the output shaft movement conditions, permits to change gear securely, even if the output shaft is fully stopped.

For facilitating this partial clutch engagement and make the operation progressive as required, the clutch is arranged to operate, when the discs are only slightly pressed, by means of an additional disc 108 formed as a resilient frustro-conical ring, which is able to operate alone to develop the necessary torque.

It is also convenient to form the engaging teeth with faces 109, 110 bevelled in the same direction, as shown in FIG. 4. If the faces 109 rotate in the direction of the arrow $f_1$ and move towards the faces 109 in the direction of the arrow $f_2$, the faces 109, 110 may slide on each other and facilitate the engagement, the common bevel angle being arranged to be substantially in the direction of the resultant of the movements indicated by $f_1$ and $f_2$.

What we claim is:

1. A gear system comprising input and output shafts, gears on said shafts, a pump including a pumping member coupled to and driven by one of said shafts to provide an output pressure means operatively associated with said gears for changing the combinations thereof, locking means coupled to the first said means and adapted to prevent operation thereof, pressure sensitive means coupled to said pump and responsive to the output pressure of the pump, a fluid motor for actuating said locking means, a control valve coupled to said pressure sensitive means, and a circuit of fluid under pressure interconnecting said fluid motor and said control valve, said pressure sensitive means being responsive to the exceeding of a predetermined pressure in said pump for controlling substantially simultaneously said control valve, said fluid motor and said locking means to render the first said means inoperative, thus preventing the changing of gear combinations during operation of said system.

2. A system as claimed in claim 1 wherein said gears are constantly in mesh and comprising no more than one said pump.

3. A system as claimed in claim 1 comprising selectively operable braking means including means coupled to the input shaft.

4. A system as claimed in claim 1 wherein said pressure sensitive means comprises an electrical switch and a solenoid valve coupled to said switch and controlled thereby to operate said fluid motor and the first said means.

5. A system as claimed in claim 1 in combination with an engine and comprising a brake and clutch means coupled to said input shaft, a control coupled to the latter said means to control the same selectively to brake said input shaft and couple the shaft to said engine, and means responsive to said control to idle said engine.

6. A system as claimed in claim 1 wherein said locking means comprises delay means selectively operable to retard operation of the locking means while the first said means is operative to change the combination of gears.

7. A system as claimed in claim 1 wherein the first said means comprises movable members for selectively combining said gears, pressure responsive members for controlling said movable members, a source of pressure medium, and means selectively coupling said source to said pressure responsive members.

8. A system as claimed in claim 7 wherein said locking means comprises members adapted to engage selectively said pressure responsive members.

9. A system as claimed in claim 8 wherein said locking means is pressure responsive and is coupled to said source.

10. A system as claimed in claim 7 wherein the latter said means comprises a distributor including a plurality of slide valves corresponding to said pressure responsive members and adapted for selectively coupling the latter to said source.

11. A system as claimed in claim 10 comprising a control coupled to said distributor for controlling said slide valves.

12. A system as claimed in claim 11 wherein said latter means comprises an impulse control and valve means coupled to said impulse control and responsive thereto for coupling said source to said distributor.

13. A system as claimed in claim 11 wherein said control comprises a source of pressure medium for controlling said slide valves.

14. A system as claimed in claim 1 in combination with an engine and comprising a brake and clutch means including means coupled to said input shaft, a control coupled to the brake and clutch means to control the same selectively to brake said input shaft by disconnecting said clutch means, means responsive to said control to idle simultaneously said engine, and delay means for partially releasing said brake and partially engaging said clutch, said delay means being operatively connected to said control valve, thus giving to said input shaft a slow motion with a low driving torque, when a gear is about to be engaged.

15. A system as claimed in claim 14 wherein said clutch means comprises a plurality of engageable discs and a resilient conical member urging said discs together.

16. A system as claimed in claim 14 wherein said clutch means comprises engageable members having opposed surfaces with bevels in the same direction.

References Cited in the file of this patent

UNITED STATES PATENTS

| | | |
|---|---|---|
| 2,035,678 | Swift | Mar. 31, 1936 |
| 2,121,157 | Lempereur et al. | June 21, 1938 |
| 2,491,087 | Cardwell et al. | Dec. 13, 1949 |
| 2,519,794 | Siekmann et al. | Aug. 22, 1950 |